United States Patent [19]

Kim

[11] Patent Number: 6,042,675
[45] Date of Patent: Mar. 28, 2000

[54] LAMINATING METHOD AND LAMINATION SHEET

[75] Inventor: Yang-Pioung Kim, Seoul, Rep. of Korea

[73] Assignee: GMP Co., Ltd., Seoul, Rep. of Korea

[21] Appl. No.: 09/036,677

[22] Filed: Mar. 9, 1998

[30] Foreign Application Priority Data

Jan. 30, 1998 [KR] Rep. of Korea .................. 98/2504

[51] Int. Cl.[7] .................... B44C 1/165; B32B 31/00; B41M 3/12; B05D 1/28; B29B 1/165
[52] U.S. Cl. .................... 156/230; 156/231; 156/238; 156/242; 156/247; 156/289; 427/146; 427/148; 427/428; 428/914
[58] Field of Search .................... 156/230, 231, 156/232, 233, 234, 235, 236, 237, 238, 239, 240, 241, 247, 277, 289, 163, 164, 542; 427/146, 147, 148, 428; 428/447, 451, 914

[56] References Cited

U.S. PATENT DOCUMENTS

| | | | |
|---|---|---|---|
| 2,559,649 | 7/1951 | Little et al. ........................... | 154/97.5 |
| 3,990,932 | 11/1976 | Dupire ................................... | 156/230 |
| 4,060,441 | 11/1977 | Ohta et al. ............................. | 156/234 |
| 4,225,647 | 9/1980 | Parent ................................... | 428/336 |
| 5,397,634 | 3/1995 | Cahill et al. ......................... | 428/304.4 |
| 5,527,759 | 6/1996 | Oshima et al. ....................... | 503/227 |
| 5,681,660 | 10/1997 | Bull et al. ............................. | 428/500 |
| 5,807,461 | 9/1998 | Hangstrom ............................ | 156/361 |

OTHER PUBLICATIONS

Booth, G.L., "Coating Equipment and Processes", Lockwood Publishing Co., Inc. New York, NY. p. 39 1970.

*Primary Examiner*—Richard Crispino
*Assistant Examiner*—J. A. Lorengo
*Attorney, Agent, or Firm*—Harrison & Egbert

[57] ABSTRACT

A laminating method for objects such as important documents, old documents and other printed matters to prevent a forgery or quality degradation of those objects or to protect the surfaces of those objects. In the lamination method, a released paper sheet, released synthetic resin film or non-released synthetic resin film is laminated using a thermoplastic resin solution, thereby forming a lamination sheet as a medium, so that the resultant synthetic resin thin film on the lamination sheet is subsequently transferred onto an object as the lamination sheet passes through a nip defined between pressing rollers along with the object.

3 Claims, No Drawings

LAMINATING METHOD AND LAMINATION SHEET

BACKGROUND OF THE INVENTION

1. Field of the Invention

The present invention relates to a method for laminating an object to be laminated, using a thermoplastic resin solution (transparent thermoplastic ink), and particularly to a laminating method, which involves laminating a sheet, as a medium, using a thermoplastic resin solution, and transferring the resultant laminate on the lamination sheet onto an object to be laminated, without directly laminating the object using the thermoplastic resin solution, and the lamination sheet which is used in the laminating method. More particularly, the present invention relates to a laminating method, in which a released sheet such as an overlay paper, release paper or synthetic resin film is laminated using a thermoplastic resin solution (transparent thermoplastic ink) obtained by dissolving a polyolefine-based synthetic resin such as polyethylene, polypropylene, PVC or polystyrene in an organic solvent, thereby forming a lamination sheet (a medium), and the resultant laminate on the lamination sheet is then transferred onto an object to be laminated, and the lamination sheet which is used in the laminating method.

2. Description of the Prior Art

Laminating methods are well known which are used to coat a thermoplastic resin solution over an object to be laminated, in the form of a thin film, in order to obtain anti-moisture, seal maintenance and printed surface protection purposes of the object. In conventional laminating methods, a thermoplastic resin film made of a polyolefine-based thermoplastic resin such as polyethylene, polypropylene and PVC or a polyester film is thermally fused onto both surfaces of an object (a printed sheet), such as a resident card or other identification cards, to be laminated, in order to prevent a forgery of the object or to protect the content of the object. The resultant films on the object are then cut along a line spaced apart from each edge of the object by a desired distance, so as to produce a laminated product of a desired size. Such methods have also been used for large-size old documents, deterioratable important documents, and other printed paper.

However, the conventional laminating methods have drawbacks of a rough appearance and a large consumption of the synthetic resin material due to an excessive thickness of the synthetic resin film. Furthermore, the synthetic resin film exhibits a degraded adhesion to the surface of the object. As a result, the film may be easily undone from the surface of the object. In addition, the characters or figures printed on the object may be indistinctly viewed because their images are viewed in a refracted state.

Where large-size printed matter is laminated in accordance with the above mentioned conventional methods, a synthetic resin film having a large size is used. Due to the large size, however, the synthetic resin may have folded or wrinkled portions. Furthermore, a severe looseness of the film may occur due to an entrapment of air between the film and object. In addition, there is an inconvenience in that after the lamination, the laminate should be cut along a line spaced apart from each edge of the object by a certain distance.

In order to solve the above mentioned problems, a roller coating method has also been proposed which utilizes a lamination of a synthetic resin solution using a coating roller. For example, this method has been used to obtain anti-moisture and seal maintenance characteristics of paper bags containing a dose of sugar or medicine, thereby preventing a physical or chemical degradation in the quality of the content due to a moisture absorption of the content or a contact of the content with air. This method has also been used to protect the surface of printed matter.

In accordance with this method, a printed or unprinted object, which is wound around a wind roller in the whole uncut paper state, is continuously coated at one or both surfaces thereof with a synthetic resin solution using one or more coating rollers while being fed by guide rollers. The coated object is then dried. Thus, a lamination of the object is achieved.

The synthetic resin solution consists of a synthetic resin dissolved in an organic solvent. Where the coating process is carried out for a printed surface, the organic solvent of the synthetic resin solution comes into contact with the print ink of the characters or figures printed on the object. As a result, the print ink may be dissolved and dispersed. This results in a contamination of the printed matter, thereby causing a degradation in the print quality. Moreover, an offensive smell is generated during an evaporation of the organic solvent. In addition, such a generation of the organic solvent gas becomes severe because the synthetic resin solution is used in a heated state. This may result in severe damage to the human body.

For this reason, the laminating method using a synthetic resin solution has been used only in factories in a mass-production fashion. In other words, coating a synthetic resin solution over an object using a small-scale laminator (a thermal fusing machine) in homes or offices is generally avoided.

SUMMARY OF THE INVENTION

Therefore, an object of the invention is to solve the above mentioned problems involved in the conventional laminating methods, in which a paper sheet, printed paper sheet or synthetic resin film is laminated using a synthetic resin solution, and to provide a laminating method in which a released uncut paper sheet or synthetic resin film is laminated using a thermoplastic resin solution, thereby forming a lamination sheet as a medium, so that the resultant synthetic resin thin film on the lamination sheet is subsequently transferred onto an object, such as large-size old documents, deterioratable important documents, and other printed paper, to be laminated, by use of a small-scale laminator (a roller type thermal fusing machine) in homes or offices.

Another object of the present invention is to provide a lamination sheet which is coated with a thermoplastic synthetic resin thin film to be subsequently transferred onto an object to be laminated.

In accordance with the present invention, these objects are accomplished by providing a lamination method for objects such as important documents, old documents and other printed matters comprising the steps of: preparing a thermoplastic synthetic resin solution consisting of a thermoplastic synthetic resin, selected from the group consisting of polyethylene, polypropylene, polyvinyl chloride, and polystyrene, dissolved in an organic solvent selected from the group consisting of toluene, methyl ethyl ketone, ethyl alcohol and xylene; laminating a substrate, which is a released paper sheet, a released synthetic resin film or a non-released synthetic resin film, with the thermoplastic synthetic resin solution in accordance with a roller coating method; drying the thermoplastic synthetic resin solution coated on the substrate, thereby obtaining a lamination sheet coated with a thermoplastic synthetic resin thin film; passing the lamination sheet along with the object through a nip defined between pressing and heating rollers in such a manner that the thermoplastic synthetic resin thin film on the lamination sheet is in contact with a surface of the object to be laminated; and separating the object from the lamination sheet, whereby the synthetic resin thin film of the lamination sheet is transferred onto the surface of the object.

DESCRIPTION OF THE PREFERRED EMBODIMENTS

In accordance with the present invention, a lamination sheet is prepared which is used as a medium for laminating an object, to be laminated, with a thermoplastic synthetic resin solution (transparent synthetic resin ink). The preparation of the lamination sheet is achieved by coating the thermoplastic synthetic resin solution over a released film, thereby forming a thermoplastic synthetic resin thin film over the released film.

The thermoplastic synthetic resin solution, which is used as a laminate material according to the present invention, consists of a thermoplastic synthetic resin dissolved in an organic solvent. The thermoplastic synthetic resin may comprise polyethylene, polypropylene, polyvinyl chloride, or polystyrene which are polyolefine-based synthetic resin. The organic solvent may comprise toluene, methyl ethyl ketone, ethyl alcohol, or xylene.

The solubility of polyolefine-based synthetic resins, which are used as a laminate material according to the present invention, to an organic solvent is extremely low at room temperature. At a higher temperature, such polyolefine-based synthetic resins are eroded by or dissolved in the organic solvent.

For example, polyethylene is dissolved in the organic solvent at a temperature of 200° F. or above where it has a low density. In the case of low molecular polyethylene, it can be slightly dissolved in turpentine, naphtha or xylene. In the latter case, it is used in a state dissolved in toluene or xylene at a temperature of 83° F. or above. Polypropylene is not dissolved in an organic solvent at room temperature, but softened by a heated solvent. Such polypropylene can be dissolved in an organic solvent added with an oxidant. PVC can be dissolved in an organic solvent at a high temperature when it is added with a plasticizer. On the other hand, polystyrene is dissolved in organic acid, alkali or alcohol at room temperature. However, such polystyrene is dissolved in a hydrocarbon solvent only at a high temperature.

Taking into consideration the above mentioned properties, a desired thermoplastic synthetic resin solution (transparent synthetic resin ink) is prepared in accordance with the present invention. In accordance with the present invention, the prepared thermoplastic synthetic resin solution is used in a state maintained at a high temperature in a lamination process using a roller coating. The reason why the thermoplastic synthetic resin solution is maintained at a high temperature is to reduce the generation of solvent vapor during the lamination process as much as possible. However, it is preferred that the thermoplastic synthetic resin solution be maintained at a temperature not higher than the azeotropic point of the organic solvent used.

The azeotropic point of the organic solvent used is 110.7° C. in the case of toluene, 79.6° C. in the case of methyl ethyl ketone, and 78.3° C. in the case of ethyl alcohol. In addition, the azeotropic point of xylene (meta and para) ranges from 138° C. to 139° C. Accordingly, it is undesirable to heat the thermoplastic synthetic resin solution to a temperature higher than the azeotropic point of the organic solvent used. This heating temperature may vary in accordance with the organic solvent used.

For the released sheet to be coated with the thermoplastic synthetic resin solution, thereby preparing a lamination sheet, an overlay paper is preferably used. A synthetic resin film may also be used. It is preferred that the film have a hardness rather than softness while having a flexibility rather than stiffness, in terms of an easy laminating process subsequently carried out and an improvement in the quality of laminated products. However, the synthetic resin film should have no adhesion. Also, the synthetic resin film should not be easily eroded by the organic solvent of the thermoplastic synthetic resin solution used.

The preparation of the lamination sheet is achieved by coating the thermoplastic synthetic resin solution over the released film or other non-released film in accordance with a direct roller coating method, thereby forming a thermoplastic synthetic resin thin film having a very small thickness over the released film, and then drying the thermoplastic synthetic resin thin film. In the process of the drying step, the organic solvent in the thermoplastic synthetic resin solution coating is substantially evaporated, thereby leaving the thermoplastic synthetic resin in the form of a thin film on the sheet. Preferably, the thermoplastic synthetic resin thin film has a thickness ranging from 0.005 $\mu$m to 0.01 $\mu$m.

The lamination sheet prepared as mentioned above can be subsequently used to laminate a variety of printed matters such as important documents, old documents, identification cards or certificates. In a lamination process, the lamination sheet passes through a nip defined between heating rollers in a small-scale laminator (a thermal fusing machine) along with an object to be laminated in such a manner that its synthetic resin coating layer is in contact with the surface of the object to be protected. As the lamination sheet and object pass through the nip, the coating layer of the lamination sheet is transferred onto the surface of the object. Thus, the object is laminated with the synthetic resin coating layer.

Preferably, the lamination sheet has a size larger than that of the object by a length of 5 mm to 10 mm at each edge thereof. When the object is separated from the lamination sheet after the completion of the lamination process, it is in a state coated with the synthetic resin thin film over the entire surface thereof. In this case, the synthetic resin thin film extends slightly beyond each edge of the object.

As apparent from the above description, the present invention provides a lamination method in which a substrate such as a released paper sheet, released synthetic resin film or non-released synthetic resin film is laminated using a thermoplastic resin solution in accordance with a lamination process, thereby forming a lamination sheet as a medium, so that the resultant synthetic resin thin film on the lamination sheet is subsequently transferred onto an object, such as various documents or printed matters, to be laminated. In accordance with the present invention, it is possible to eliminate a pollution caused by the solvent used. It is also possible to achieve a lamination using thermal pressing rollers, namely, a small-scale laminator (a thermal fusing machine), in homes or offices. The lamination method of the present invention enables the formation of a synthetic resin coating having a very small thickness from a synthetic resin solution in order to protect various printed matters such as resident cards, certificates, identification cards, important documents or old documents and to prevent a deterioration in the quality of those printed matters. Accordingly, it is possible to greatly reduce the consumption of the synthetic resin material, as compared to the conventional methods. In addition, there is no loosening nor wrinkling phenomenon. Furthermore, the synthetic resin coating film according to the present invention exhibits a good adhesion to the object. In accordance with the present invention, it is also possible to improve the resolution of the characters and figures printed on the object. The lamination method of the present invention also eliminates the cutting process involved in the conventional laminating methods.

In addition, the laminated surface of the object is smooth, glossy and smart. In this regard, the lamination method of the present invention is a highly valuable lamination method. Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A lamination method for an object comprising the steps of:

preparing a thermoplastic synthetic resin solution consisting of a thermoplastic synthetic resin selected from the group consisting of polyethylene, polypropylene, polyvinyl chloride and polystyrene, dissolved in an organic solvent selected from the group consisting of toluene, methyl ethyl ketone, ethyl alcohol and xylene;

heating said thermoplastic synthetic resin solution;

laminating a substrate selected from the group consisting of a released paper sheet, a released synthetic resin film and a non-released synthetic resin film, with the heated thermoplastic synthetic resin solution by roller coating;

drying the heated thermoplastic synthetic resin solution coated on the substrate to obtain a lamination sheet coated with a thermoplastic synthetic resin film;

passing the lamination sheet along with the object through a nip defined between pressing and heating rollers so that the thermoplastic synthetic resin film on the lamination sheet is in contact with a surface of the object to be laminated; and separating the object from the lamination sheet such that the synthetic resin film of the lamination sheet is transferred onto the surface of the object.

2. The lamination method according to claim 1, wherein the synthetic resin film has a thickness ranging from 0.005 $\mu$m to 0.01 $\mu$m.

3. The lamination method of claim 1, said step of heating comprising:

heating said thermoplastic synthetic resin solution to a temperature just below an azeotropic temperature of said organic solvent.

* * * * *